May 19, 1959 L. LEE II 2,887,119
SPEED-RESPONSIVE CONTROL
Filed June 16, 1954 4 Sheets-Sheet 1

INVENTOR.
LEIGHTON LEE II
BY
*Lindsey and Prutzman*
ATTORNEYS

May 19, 1959

L. LEE II 2,887,119

SPEED-RESPONSIVE CONTROL

Filed June 16, 1954

INVENTOR.
LEIGHTON LEE II
BY
Lindsey and Prutzman
ATTORNEYS

May 19, 1959 L. LEE II 2,887,119
SPEED-RESPONSIVE CONTROL
Filed June 16, 1954 4 Sheets-Sheet 4

INVENTOR.
LEIGHTON LEE II
BY
Lindsey and Pritzman
ATTORNEYS

United States Patent Office 2,887,119
Patented May 19, 1959

2,887,119

SPEED-RESPONSIVE CONTROL

Leighton Lee II, Guilford, Conn.

Application June 16, 1954, Serial No. 437,057

11 Claims. (Cl. 137—48)

The present invention relates to speed-responsive controls or governors of the type which may be utilized to control a fluid system responsive to speed of the apparatus with which the governor is associated. This application is a continuation-in-part of my copending application Serial No. 188,685, filed October 6, 1950, now Patent No. 2,697,328.

A particular application of a speed control of the type embodying the present invention is in connection with the fuel system of an internal combustion engine. The speed control or governor may be driven by the engine and may be utilized to regulate the fuel flow to the engine primarily through a fluid-operated control system.

A principal aim of the present invention is to provide a speed-responsive control or governor which also is responsive to the rate of acceleration or deceleration of the apparatus with which the control is associated.

A further object of the invention is to provide a speed-responsive control or governor which may be set for operation at varying speeds. Included in this aim is to provide means to permit variation in the speed at which the governor will function while the governor is in operation.

A further aim of the invention is to provide a speed control device of the type referred to which will have a uniform sensitivity to speed as well as to acceleration and deceleration regardless of the setting of the governor.

A further aim of the invention is to provide a speed-responsive control which is of simple construction utilizing a minimum of moving parts which will function efficiently over long periods of time and which is light-weight and compact in design so that it may be employed in control systems where space and weight are important factors.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

When employed as speed governors in engine-control system applications, speed-responsive controls of the type with which the present invention is concerned are adapted to perform their speed-regulating function by varying the pressure of a control fluid which is in turn employed to control the fuel feed to the engine through suitable control means such as, for example, a pressure-sensitive fuel flow regulating valve. For a specific example of a control system arrangement utilizing a speed responsive control in connection with a turbojet engine, reference may be had to my copending application, Serial No. 188,685, filed October 6, 1950. In the arrangement there described, air at compressor discharge pressure serves as a control fluid, and is utilized to position a fuel-regulating valve. The governor performs its speed control function by regulating the flow of the control fluid responsive to engine speed.

Figure 1:
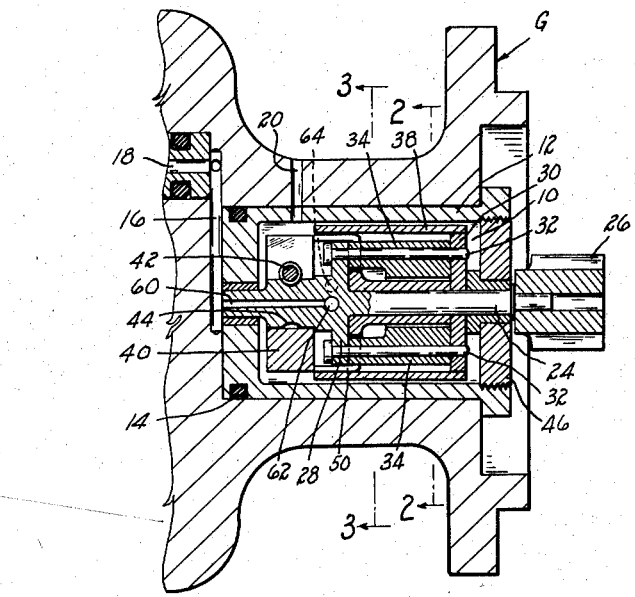
Figure 1 is a section view of a simplified embodiment of a governor constructed in accordance with the present invention.

Turning now to the details of a simplified speed-responsive control constructed in accordance with the present invention, reference should be had to Figure 1 of the drawings. The governor shown in Figure 1 is mounted within a cylindrical chamber 10 at one end of a housing G which may be a part of the fuel control system for which it serves as the speed governor. The governor includes a cylindrical casing 12 which defines the chamber 10 and is sealed to the housing by means of a seal 14.

Connected to one end of the chamber 10 is a passage 16 in housing G which at its other end is connected to a passage 18 through which flows the pressurized control fluid, which may be either gas or liquid, employed to regulate fuel flow to the engine. The governor of Figure 1 performs its regulating function in an "On"-"Off" manner, which is to say that it either closes the passage 18, thus maintaining the pressure therein, or it vents the passage 18, thus reducing the operating pressure. A port 20 in the side of casing 12 and housing G serves as the vent. Port 20 may be connected to atmosphere, as shown, or to a sump or return line, not shown, if the control fluid is a liquid or otherwise non-expendable.

Figure 2:
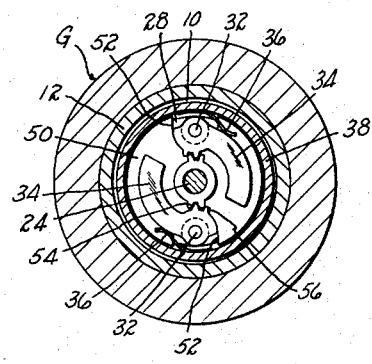
Figure 2 is a cross-sectional view of the structure shown in Figure 1, taken on the line 2—2 thereof.
Figure 3:
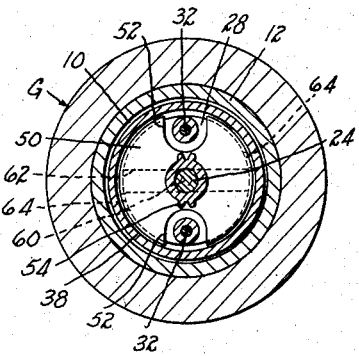
Figure 3 is a cross-sectional view of the structure shown in Figure 1, taken on the line 3—3 thereof.

Extending axially of the casing 12 is a rotatable shaft 24 journaled in opposite ends of the casing. The right-hand end of the shaft 24 as viewed in Figure 1 is provided with a pinion 26 which may be geared to the engine in any suitable manner for rotation therewith at a speed proportional to engine speed, and in a counter-clockwise direction as shown in Figures 2 and 3.

The shaft 24 is formed with an integral annular shoulder 28 intermediate the ends thereof and also has fixed thereto a circular plate 30. Extending between the shoulder 28 and plate 30 is a pair of oppositely spaced, longitudinally extending pivot pins 32. Pivotally mounted on the pivot pins 32 is a pair of weights 34, the weights 34 being generally arcuate in cross section and being journaled adjacent one edge on the pivot pins 32 so that the free ends thereof are free to move radially outwardly due to centrifugal force when the shaft 24 is rotated.

The weights 34 are urged inwardly by means of leaf springs 36 having one edge engaging against the periphery of the weights 34 and secured at their other end to a cylinder 38. The cylinder 38 is mounted on a disc 40 which is connected to the shaft 24 by means of a worm 42 journaled in the disc 40 and engaging teeth 44 formed in the adjacent portion of the shaft 24. By adjusting the position of the cylinder 38 relative to the shaft 24 by turning the worm 42, the points at which the springs 36 engage against the weights 34 may be varied, thereby varying the centrifugal force and hence the speed of rotation of the shaft 24 required to pivot the weights 34 outwardly of the governor.

Mounted on the shaft 24 is a cup-shaped valve 50 surrounding the annular shoulder 28. The cup-shaped valve 50 is notched at 52, as best shown in Figure 3 of the drawings, to accommodate the pivot pins 32 and to permit relative rotational movement of the valve 50 with respect to the annular shoulder 28. The valve 50 is provided with teeth 54 which are engaged by teeth 56 formed on the weights 34. Accordingly, as the weights are pivoted outwardly, they tend to move the valve clockwise as shown in Figure 3 and hence retard the valve 50 relative to the shaft 24 and, conversely, when the weights 34 are moved inwardly of the governor under the influence of springs 36, the valve 50 is advanced counterclockwise relative to the shaft 24.

The inner end of the shaft 24 is provided with an axial bore 60 which communicates at one end with a transverse bore 62 in the annular shoulder 28, and is connected at its other end to the passage 18 through which flows the control fluid whose pressure is utilized to control the fuel flow to the engine. The cup-shaped valve 50 is provided with ports 64 which are adapted to be moved into and out of registry with the bore 62 as the cup-shaped valve 50 is rotated relative to the shaft 24.

In the operation of the speed-responsive control as a governor, when the engine speed has been increased to the maximum for which the governor has been set, the weights 34 will turn the cup-shaped valve 50 clockwise as shown in Figure 3 relative to the shaft 24 and shoulder 28 so as to vent the transverse bore 62 and thus vent the axial bore 60 to the interior of the chamber 10 through ports 64. The chamber 10, in turn, is vented through port 20. As a result, the attainment of maximum speed for the engine will result in the venting of the control fluid in passage 18, with the resultant decrease in its pressure causing a decrease in fuel delivered to the engine and an attendant leveling off of engine speed.

In accordance with the invention, the cup-shaped valve 50 is provided with a relatively large mass and, as previously described, is geared to the weights 34 through the teeth 54, 56, by what amounts to approximately a 1:1 gear ratio. As a result, the inertia of the cup-shaped valve 50 is sufficiently great so that, when the engine is accelerated or decelerated, the cup-shaped valve 50 will resist turning movement created by the pivoting action of the weights 34. As a result, the governor is rendered not only responsive to speed, but also responsive to the rate of acceleration or deleceration with which the governor attains the speed for which it is set. Assuming that the engine is being operated at a lower speed than that for which the governor is set, the weights will be pivoted inwardly, thus retarding the cup-shaped valve 50 to close the ports 64 which, as previously explained, increases the fuel supply to the engine. As the engine approaches the speed for which the governor is set, the weights will tend to pivot outwardly sufficiently to retard the cup-shaped valve 50 to open the ports 64. However, if the engine is accelerating rapidly as the engine speed approaches that for which the governor is set, the cup-shaped valve 50 due to its inertia will tend to lag, thus causing venting of the ports 64 before the engine speed actually has attained that for which the governor is set. The result is that the fuel supply to the engine will be reduced in sufficient time to cause the engine to smoothly reach the set speed without overshooting. With a reduction in fuel supply, of course, the rate of acceleration will decrease, thus reducing the drag of the cup-shaped valve 50 due to inertia, thereby permitting the cup-shaped valve to assume the position to which the weights are intended to move the valve at the constant speed for which the governor is set. Similarly, if the engine were operating above the speed for which the governor is set and the engine is decelerated, the inertia of the cup-shaped valve will cause the closing of the ports 64 to occur at a speed in advance of the set speed of the governor, thus permitting smooth deceleration to the set speed without undershooting.

The greater the rate of acceleration or deceleration, the greater will be the speed differential at which the governor acts, so that the tendency of the engine to overshoot the governor speed, which will vary with the rate of acceleration or deceleration will be corrected. Without this modification the engine would overshoot the maximum speed, and then in slowing down would undershoot the maximum speed limit with the result that the engine would hunt or pulsate. By the use of a speed-responsive control which is acceleration-sensitive as above described, such a hunting or pulsating effect may be avoided and the control serves as a governor which will permit a precise approach to a stabilized speed.

Figure 5:
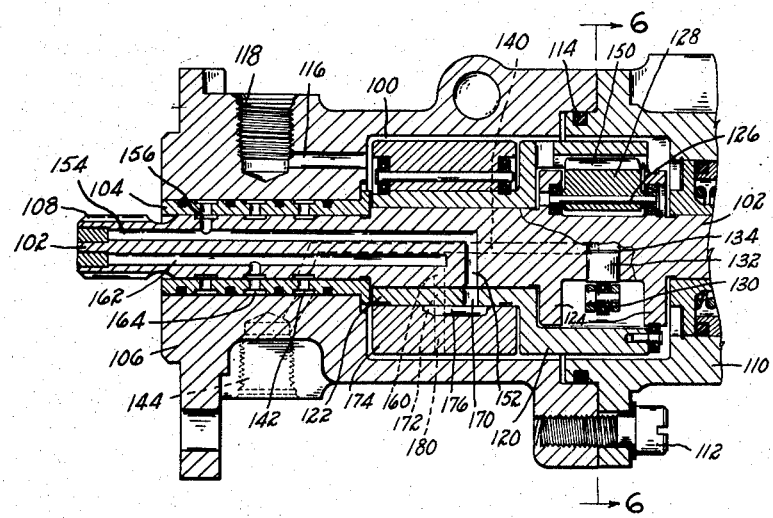
Figure 5 is a sectional view of a second embodiment of a speed-responsive control constructed in accordance with the present invention, taken on the line 5—5 of Figure 6.

Figure 5 shows another embodiment of a speed-responsive control constructed in accordance with the present invention. As in the case of the embodiment shown in Figures 1–3 previously described, the control may be utilized to close or vent a passage containing a control fluid under pressure and thereby, for example, regulate fuel flow to an engine. However, to illustrate further uses of the invention, the embodiment shown in Figure 5 contains additional passageways so that the valve may be employed not only to close or vent a passage to the control device but also to admit fluid under pressure to such passage.

Figure 4:
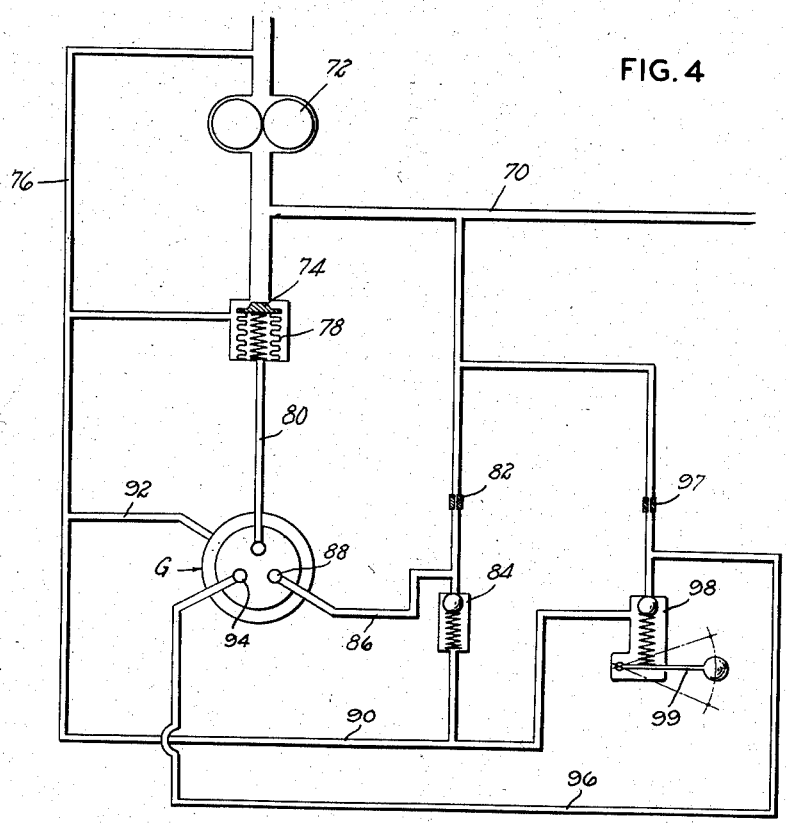
Figure 4 is a schematic view of an exemplary engine fuel-control system of the type with which the speed-responsive control of the present invention may be employed.

Figure 4 shows schematically an exemplary simplified control arrangement illustrating one way in which the speed-responsive control of Figure 5 may be employed as a governor in connection with an internal combustion engine. As shown in Figure 4, fuel is supplied to the engine through passage 70 by a main fuel pump 72. The fuel pump 72 may be of the constant volume type having a fixed capacity output independent of engine speed. The output side of the pump is connected through passage 70 to the engine and through a bypass valve 74 to a bypass passage 76 returning to the suction side of the pump. The degree of opening of the bypass valve 74 is controlled by an inflatable bellows 78, the inflation of which is determined by the pressure of control fluid supplied to the bellows through passage 80. It will be apparent that, by regulating the bypass valve opening, the proportion of the pump output flowing through the bypass passage 76 can be varied, and thus the amount of fuel delivered to the engine can be varied. Thus the bypass valve 74 and bellows 78 serve as a pressure-sensitive fuel flow control device, regulating fuel delivery to the engine in accordance with control fluid pressure supplied to the bellows through passage 80. The pressure of the control fluid supplied to the bellows through passage 80 is in turn regulated by the speed-responsive control or governor, designated generally at G.

Any suitable source of pressurized fluid may be employed as a high-pressure control fluid supply. In the illustrative arrangement shown in Figure 4, the control fluid is fuel itself, bled from the fuel line 70 to the engine and reduced in pressure through an orifice 82, regulated to any desired maximum pressure by a conventional pressure regulator valve 84, and fed through passage 86 to the governor control fluid supply port 88. The discharge side of regulator valve 84 is connected by passage 90 to bypass passage 76.

The governor has a vent port which is connected through a passage 92 to the bypass passage 76 and thus to the low-pressure side of the fuel pump. Thus, in accordance with the operation of the governor, the pressure within bellows 78 may be either reduced by connecting bellows passage 80 to passage 92, or may be increased by connecting passage 80 to the governor control fluid supply passage 86.

In the simplified embodiment shown in Figure 1 as previously described, the engine speed at which the valving action takes place is determined or selected by mechanically varying the effective force of the springs 36 by turning the worm 42, an operation which in such embodiment must be carried out while the governor is not in use. In the preferred embodiment of Figure 5, however, the engine speed at which the various valving actions of the governor take place may be selected while the governor is in operation by a manually variable reference control pressure applied to the governor at port 94. In the schematic diagram of Figure 4 this reference pressure is applied to the governor through a passage 96 having a restricter 97 and connected to the engine fuel line 70. If desired, the reference control pressure may be obtained from any other source and may be made responsive to other factors which may limit permissible speed such as engine discharge pressure. The reference pressure applied to the port 94 may be varied manually by a speed selector such as the spring-biased relief valve 98 shown in Figure 4, which is manually settable by positioning handle 99. Thus by positioning handle 99 to adjust the reference pressure supplied to the governor at port 94, the maximum speed to which the governor will limit the engine may be adjusted to any desired value.

Turning now to the details of the structure shown in Figure 5, the speed-responsive control includes a housing G having a cylindrical chamber 100 within which is a rotating unit including a shaft 102 journaled in a bushing 104 and an end plate 106. One end of shaft 102 projects from housing G and has a pinion 108 which may be geared to the engine in any suitable manner for rotation of shaft 102 at a speed proportional to the engine speed. The end plate 106 is supported in a cover plate 110 which is fastened to housing G by screws 112 or the like and seals the chamber by means of seal 114. Chamber 100 is vented to a low-pressure point such as the bypass passage 76 in Figure 4, through passage 116 and port 118 in housing G.

A cup-shaped valve 120 is rotatably mounted on shaft 102 within chamber 100 by means of an elongate hub 122. The shaft 102 has a pair of shoulders 124 between which is a pair of diametrically spaced pivot pins 126. Pivotally supported on the pivot pins is a pair of arcuate-shaped weights 128 arranged with their centers of mass spaced from pivot pins 126 so that the free ends of the weights move radially outward in response to centrifugal force when shaft 102 is rotated. On the end of each weight opposite its free end is a ball bearing 130. The bearings 130 engage the ends of a pair of pistons or plungers 132 slidably supported in aligned radial bores 134 in the shaft 102. Each of the plungers 132 is backed up by a compression spring 136 serving as an idler speed spring confined between the plunger and a shoulder 138 in bore 134, and is thus maintained in contact with a bearing 130. A single throughbore in place of bores 134 and a single spring in place of springs 136 may be utilized if desired.

For the purpose of enabling varying of the centrifugal force and hence the speed of rotation of shaft 102 required to pivot weights 128 outward, provision is made for varying the force urging plungers 132 radially outward. To this end there is connected to each of the bores 134 a first longitudinal passage 140 in shaft 102 which connects at its other end through an annular slot 142 in bushing 104 to a port 144 in the housing. Port 144 is adapted to be connected to a source of manually variable reference control pressure for the governor such as that available in passage 96 of Figure 4. With this arrangement, it will be recognized that outward pivoting movement of the free ends of the weights 128 will not take place until a speed is reached sufficient to overcome the force behind the plungers 132. Thus by regulating the reference control pressure applied to port 144, the pressure behind the plungers and hence the bias on the weights 128 may be varied. This use of hydraulic pressure on plungers 132 has the advantage that for a given reference control pressure the pressure behind plungers 132 remains constant regardless of radial movement of the plungers 132 and the pivoted position of weights 128.

Figure 6:
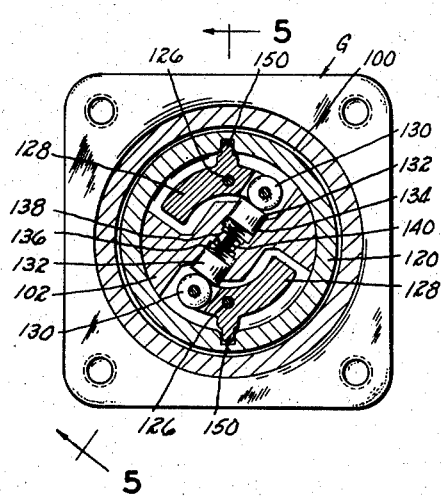
Figure 6 is a sectional view of the structure shown in Figure 5, taken on the line 6—6 thereof.

As shown in Figure 5, each of the weights 128 has a single gear tooth 150. The gear teeth 150 are engaged at diametrically spaced points with the valve 120, and hence outward pivoting of the weights 128 serves to rotate valve 120 relative to shaft 102 in a clockwise direction, as shown in Figure 6. Engagement of valve 120 with both weights insures that the movement of the weights 128 will be synchronized and that both weights will travel the same amount. Since valve 120 is rotated by weights 128 rather than moved axially, the governor requires no axial thrust bearing.

Within the hub 122 of valve 120 shaft 102 has a radial passage 152 connected to one end of a longitudinal passage 154 which is connected at its other end to an annular slot 156 in bushing 104. Slot 156 is in turn connected to a port, not shown, in the housing, and by this arrangement passage 152 is adapted to be connected to a supply of high-pressure control fluid, such as that available in passage 86 of Figure 4.

Shaft 102 has another radial passage 160 disposed within hub 122 and in the same radial plane as passage 152. Passage 160 is connected to a third longitudinal passage 162 in the shaft. Passage 162 is connected at its other end through an annular slot 164 in bushing 104 to a port, not shown, in the housing, and is thus adapted to be connected to a suitable pressure-sensitive fuel flow control device, such as the bellows 78 of Figure 4.

The hub 122 of valve 120 is apertured by a pair of radial ports 170, 172 disposed adjacent the outer ends of passages 152, 160, respectively, and arranged to register therewith in varying degrees during the governor operation. Rotatably mounted on hub 122 is a sleeve 174 which has a longitudinally disposed slot 176 in its inside wall adapted to register with ports 170 and 172 for the purpose of connecting passage 152 to passage 160, as will be explained hereinafter. The sleeve also has a radial passage 180 disposed in the same cross-sectional plane as port 172 and angularly spaced from slot 176. Passage 180 is clearly evident in Figures 7, 8 and 9, though shown only in dotted line in Figure 5, and opens at its outer end to the interior of chamber 100, thus effectively connecting to passage 116 so as to serve as a vent. Passage 180 is adapted to register with port 172 in the valve hub 122 under certain operating conditions for the purpose of venting control fluid from the passage 160 and thus relieving the pressure at a pressure-sensitive fuel flow control device such as bellows 78 of Figure 4.

Figure 7:
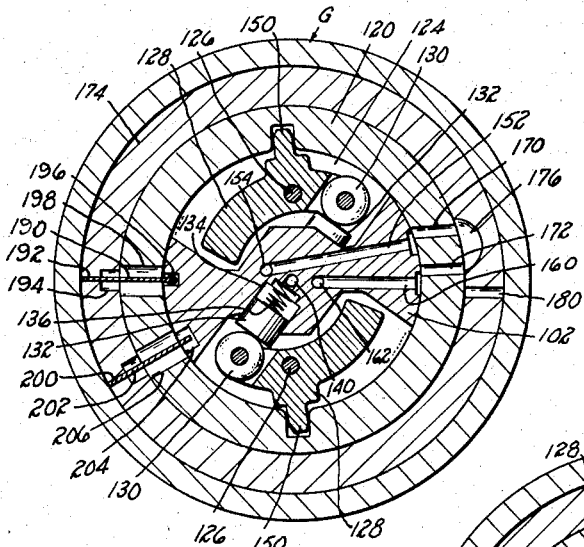
Figure 7 is an enlarged schematic cross-sectional view of the control shown in Figure 5, illustrating one operating condition thereof.
Figure 8:
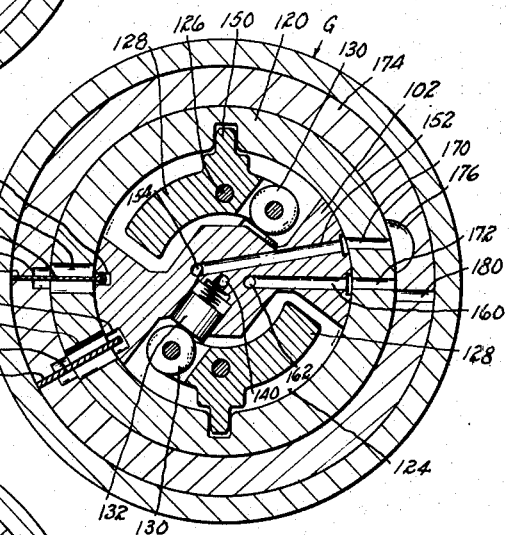
Figure 8 is a view similar to Figure 7 illustrating another operating condition of the control of Figure 5.
Figure 9:
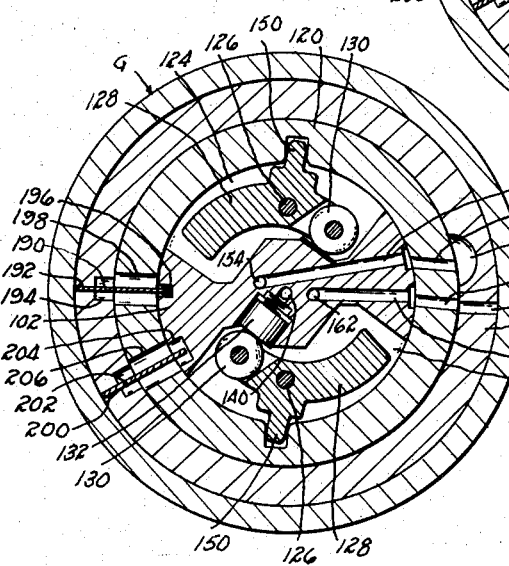
Figure 9 is a view similar to Figures 7 and 8 illustrating still another operating condition of the control of Figure 5.

As best shown in Figures 7, 8 and 9, the sleeve 174 is mechanically connected to the shaft by a radially disposed leaf spring 190 secured at its outer end within a radial slot 192 in sleeve 174. Slot 192 is somewhat widened at its inner end 194 to permit spring 190 to flex freely relative to the sleeve. Spring 190 has a rolled inner edge slidably received within a radial slot 196 in shaft 102. The spring extends through an aperture 198 in valve 120 which is of sufficient size to allow relative movement of the spring 190 and valve 120 without interference. Also supported in a longitudinal slot 200 in sleeve 174 is a relatively rigid radial arm 202, the inner end of which is freely received within a wide slot 204 in shaft 102, whose side walls serve to limit relative rotation of the shaft 102 and sleeve 174 in both directions. The arm 202 extends through an aperture 206 in the valve which is of sufficient size to allow relative movement between the arm and the valve 120 without interference.

For an understanding of the details of operation of the speed-responsive control shown in Figure 5, reference should be had to Figures 7, 8 and 9 which illustrate schematically the relative positions of the various parts under different operating conditions when employed as an engine governor. When the engine reaches its proper speed as determined by the bias on weights 128 supplied by the pressure behind the plungers 132, the free ends of the weights 128 are positioned at a radius sufficient to hold the valve 120 at the position shown in Figure 8. In this position of valve 120, port 172 is out of registry with slot 176 and the passage 152 containing control fluid at the governor supply pressure is disconnected from the passage 160 leading to the pressure-sensitive fuel flow control device. Also port 172 is covered by sleeve 174, and thus passage 160 is isolated so that its pressure remains constant. Hence the pressure supplied to the fuel flow control device such as bellows 78 will remain unchanged and steady-state conditions will be maintained, preserving the engine speed constant until it is caused to vary by some external condition.

When the engine overspeeds the limit set by the reference pressure applied behind plungers 132, weights 128 pivot farther outward and move valve 120 clockwise. Further clockwise movement of valve 120 brings the ports to the relative position shown in Figure 9, which registers port 172 with vent passage 180 in sleeve 174, thus reducing the pressure in passage 160 which in turn causes fuel flow to the engine to be decreased.

When the engine speed decreases below the level desired, the reference pressure behind the plungers 132 overcomes the centrifugal force on the weights causing the free ends of weights 128 to pivot inwardly and rotate the valve 120 relative to the shaft 102 counterclockwise to the position shown in Figure 7. In this position slot 176 uncovers both port 170 and port 172. This connects the passage 152 containing control fluid at the governor supply pressure to the passage 160 leading to the pressure-sensitive fuel flow control device, the resultant increase in pressure in passage 160 of course causing the engine to speed up.

The operation of the governor as thus far described does not provide for any variation in governing action due to rate of acceleration and deceleration. That is because in the embodiment of Figure 5 the mass of valve 120 is relatively small, and the gear ratio between the weights 128 and valve 120 is relatively large. Accordingly, the inertia of valve 120 does not have any material effect upon the positioning of valve 120. Instead, the responsiveness to rate of acceleration and deceleration is provided by the inertia of sleeve 174 which is attached to shaft 102. Since the sleeve 174 has a relatively large mass and is connected to shaft 102 only by the light flexible spring 190, it will be apparent that during acceleration of shaft 102 the sleeve tends to lag behind, i.e., the sleeve moves counterclockwise relative to the shaft. When this happens, the vent passage 180 is brought closer to the port 172 and thus less clockwise movement of the valve 120 is required before the passage is vented. Thus when engine speed increases, the governor acts to check the acceleration of the engine at a speed which is lower responsive to the rate of acceleration. This prevents the engine from overshooting the desired speed and avoids hunting or pulsation of the engine about the desired speed. As the acceleration decreases, the spring 190 restores the sleeve to the relative position shown in Figure 8.

Conversely, when the engine speed decreases, the sleeve 174 tends to overrun shaft 102 and hence moves clockwise relative to valve 120. This moves slot 176 toward port 172 and connects passage 160 to passage 152 at a speed which is higher when the rate of deceleration is increased. This prevents the engine from undershooting the desired speed. The rigid arm 202 by engagement with the sides of wide slot 204 in shaft 102 limits the movement of sleeve 174 to prevent excess flexing or breakage of spring 190.

One of the advantages of utilizing a separate sleeve 174 connected by a constant spring 190 to provide responsiveness to acceleration and deceleration is that responsiveness to a given rate of acceleration or deceleration is constant regardless of the speed for which the governor has been set. This is because the response to rate of acceleration or deceleration, which may be considered as a derivative feedback, is determined by the rotational mass of the sleeve 174 relative to the stiffness of spring 190, which factors of course are not changed by a variation in the speed setting. If, however, it is desired to change the rate responsiveness of the governor, this may conveniently be done simply by replacing spring 190 with another of different stiffness.

It thus will be seen that there has been provided in accordance with the invention a governor which is of simple and compact design and which at the same time is isochronous, in that the fuel flow can be varied through its full range for any existing error in speed. In addition, the amount of change in fuel flow will be responsive to the length of time during which the error exists and the governing action is stabilized by responsiveness to acceleration and deceleration as well as to speed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a speed-responsive control, a pair of coaxially mounted rotatable members, a weight pivotally supported by one of the members for movement responsive to centrifugal force, connecting means between the weight and the other member to cause simultaneous rotation of said rotatable members in a relatively rotated position responsive to pivoting movement of said weight, a fluid passageway in said one rotatable member, a port in said other rotatable member registrable with said passageway in selected relatively rotated positions of said rotatable members, and fluid pressure responsive biasing means carried by said one member for rotation therewith engageable with said weight for controlling pivoting movement thereof.

2. In a speed-responsive control, a pair of coaxially mounted rotatable members, a weight pivotally supported by one of the members for movement responsive to centrifugal force, connecting means between the weight and the other member to cause simultaneous rotation of said rotatable members in a relatively rotated position responsive to pivoting movement of said weight, fluid passages in said one rotatable member, a port in said other rotatable member registrable with one of said fluid passages in selected relatively rotated positions of said rotatable members, and a piston in the other of said passages engageable with said weight to bias said weight against pivotal movement in accordance with the fluid pressure in said other passage.

3. In a speed-responsive control, a rotor having a fluid passageway, a rotatable sleeve valve mounted coaxially with the rotor, a pair of weights pivotally mounted on the rotor for pivoting movement responsive to centrifugal force, gear means interconnecting the weights with the sleeve valve to cause the sleeve valve to rotate with the rotor in a relatively rotated position responsive to pivoting movement of the weights, a bore in the rotor extending between the ends of the weights, a pair of plungers in opposite ends of the bore for engaging the weights, and means including a passageway in the rotor for applying a selected fluid pressure to the bore.

4. A speed-responsive control comprising a rotor and two concentrically coaxially mounted sleeves having fluid passageways, the passageway in one sleeve being movable into and out of registry with a passageway in the rotor depending upon the relatively rotated positions of the rotor and said one sleeve, and the passageway in the other sleeve being movable into and out of registry with a passageway in said one sleeve depending upon the relatively rotated positions of the sleeves, a weight pivotally mounted on the rotor forming a driving connection between the rotor and said one of the sleeves, and a flexible member forming a driving connection between the rotor and said other of said sleeves, said flexible member being of such stiffness as to determine with the rotational mass of said other sleeve the acceleration and deceleration rate responsiveness of said speed-responsive control.

5. A speed-responsive control comprising a rotor and two concentrically coaxially mounted sleeves having fluid passageways movable into and out of registry depending upon the relatively rotated positions of the rotor and sleeves, a pair of weights pivotally mounted on the rotor for pivoting movement responsive to centrifugal force and geared to one of the sleeves, fluid-operated means for varying the bias on said weights, and a flexible member forming a driving connection between the rotor and the other of said sleeves.

6. A speed-responsive control comprising a rotor and two concentrically coaxially mounted sleeves having fluid passageways movable into and out of registry depending upon the relatively rotated positions of the rotor and sleeves, a pair of weights mounted on the rotor for pivoting movement in one direction responsive to centrifugal force, gear means between the weights and the first sleeve to advance the first sleeve responsive to pivoting movement of the weights in said one direction, fluid actuated means biasing the weights in the other direction, and a flexible connection between the rotor and the second sleeve permitting the second sleeve to move in retard or advance responsive to acceleration and deceleration, respectively, said flexible connection being of such stiffness as to determine with the rotational mass of said other sleeve the acceleration and deceleration rate responsiveness of said speed-responsive control.

7. In a speed-responsive control, a rotor, a fluid supply passage and a fluid delivery passage in said rotor, a rotatable sleeve mounted concentrically and coaxially with said rotor and rotatable relative thereto responsive to acceleration of said rotor, a spring resiliently connecting said rotor and sleeve, a discharge passage in said sleeve and a slot, a rotatable valve member concentrically coaxially mounted between said rotor and sleeve, a first port in said valve member for connecting said supply passage to said slot, a second port in said valve member for selectively connecting said delivery passage to said slot and said discharge passage in accordance with the relatively rotated positions of said valve and sleeve, a pair of weights pivotally mounted on said rotor for pivoting movement responsive to centrifugal force, and a driving connection between said weights and said valve member for rotating said valve member relative to said rotor in response to pivoting of said weights.

8. In a speed-responsive control, a fluid control valve responsive to speed and acceleration comprising a rotatable driven shaft having a fluid supply passage and a fluid delivery passage, a weight pivotally supported by the shaft for pivoting movement responsive to centrifugal force, a valve member extending around the shaft and having first and second ports rotatable into and out of registry with said supply and delivery passages, respectively, a sleeve extending around the valve resiliently connected to said shaft and having a linking passage and a vent, said sleeve being rotatable relative to the valve to register said valve ports with said linking passage and to register said vent with said second valve port, and connecting means between the valve member and the weight to rotate the valve member with the shaft and move the valve member relative to the shaft when the weight is pivoted.

9. In a speed-responsive control, a fluid control valve responsive to speed and acceleration comprising a rotatable driven shaft having a fluid supply passage and a fluid delivery passage, a weight pivotally supported by the shaft for pivoting movement responsive to centrifugal force, a valve member extending around the shaft and having first and second ports rotatable into and out of registry with said supply and delivery passages, respectively, a sleeve extending around the valve resiliently connected to said shaft and having a linking passage and a vent, said sleeve being rotatable relative to the valve to register said valve ports with said linking passage and to register said vent with said second valve port, connecting means between the valve member and the weight to rotate the valve member with the shaft and move the valve member relative to the shaft when the weight is pivoted, a control passage in said shaft, and a piston in said control passage engageable with said weight for biasing said weight against pivoting movement in accordance with the pressure in said control passage.

10. In a speed-responsive control, a rotor having a fluid supply passage, a fluid delivery passage and a control passage, a sleeve resiliently connected concentrically with said rotor for rotation therewith and rotatable movement relative thereto responsive to acceleration, a linking passage and a vent in said sleeve, a valve between said sleeve and said rotor having first and second ports registrable with said supply and delivery passages and rotatable with said rotor to register said ports with said linking passage and to register said second port with said vent, a pair of weights pivotally supported by said rotor for pivoting movement responsive to centrifugal force, said rotor having a throughbore extending between the ends of the weights and connected to said control passage, a pair of plungers at opposite ends of the throughbore engaging the weights for biasing said weights against pivoting movement in accordance with the pressure in said control passage, and gear means connecting said valve and weight for relatively moving said valve and rotor responsive to pivoting of said weight.

11. In a speed-responsive control, a rotor having a fluid supply passage, a fluid delivery passage and a control passage, a valve member on the rotor having a first port registrable with said supply passage and a second port registrable with said delivery passage, a sleeve on the valve having a slot registrable with said first and second ports and a vent registrable with said second port, a radially disposed leaf spring connecting said sleeve and rotor and extending through an aperture in said valve member to permit relative rotation of said sleeve and rotor responsive to acceleration of said shaft, a pair of weights supported by said rotor for pivoting movement responsive to centrifugal force, a bore in said rotor connected to said control passage, a pair of pistons in said bore engageable at their outer ends with said weights to variably bias said weights against pivoting movement in accordance with the pressure in said control passage, and gear means connecting said valve and weights for relatively moving said valve and rotor responsive to pivoting of said weights.

References Cited in the file of this patent

UNITED STATES PATENTS

| | | |
|---|---|---|
| 1,759,641 | Cook | May 20, 1930 |
| 2,472,181 | Werth | June 7, 1949 |
| 2,549,748 | Purdy | Apr. 17, 1951 |
| 2,648,533 | Maxwell | Aug. 11, 1953 |
| 2,702,560 | Bobier | Feb. 22, 1955 |
| 2,761,495 | Greenland | Sept. 4, 1956 |